(12) United States Patent
Okubo et al.

(10) Patent No.: US 11,613,678 B2
(45) Date of Patent: Mar. 28, 2023

(54) RELEASE LINER, METHOD OF PRODUCING RELEASE LINER, ADHESIVE SHEET, AND METHOD OF PRODUCING ADHESIVE SHEET

(71) Applicant: LINTEC Corporation, Tokyo (JP)

(72) Inventors: Takuma Okubo, Tokyo (JP); Kenji Ohata, Tokyo (JP); Akihito Yamada, Tokyo (JP)

(73) Assignee: LINTEC Corporation, Tokyo (JP)

( * ) Notice: Subject to any disclaimer, the term of this patent is extended or adjusted under 35 U.S.C. 154(b) by 0 days.

(21) Appl. No.: 17/273,437

(22) PCT Filed: Sep. 4, 2019

(86) PCT No.: PCT/JP2019/034839
§ 371 (c)(1),
(2) Date: Mar. 4, 2021

(87) PCT Pub. No.: WO2020/050332
PCT Pub. Date: Mar. 12, 2020

(65) Prior Publication Data
US 2021/0340411 A1 Nov. 4, 2021

(30) Foreign Application Priority Data

Sep. 7, 2018 (WO) .................. PCT/JP2018/033250

(51) Int. Cl.
*C09J 7/40* (2018.01)
*B29C 59/04* (2006.01)

(52) U.S. Cl.
CPC .............. *C09J 7/403* (2018.01); *B29C 59/04* (2013.01); *C09J 2301/122* (2020.08); *Y10T 428/1476* (2015.01)

(58) Field of Classification Search
CPC ..... C09J 7/403; C09J 2301/122; B29C 59/04; B29C 2059/023; Y10T 428/1476; B32B 3/30; B32B 27/00; C09K 3/00
See application file for complete search history.

(56) References Cited

U.S. PATENT DOCUMENTS 5,897,930 A * 4/1999 Calhoun ................. C09J 7/22
428/156
6,197,397 B1 3/2001 Sher et al.
(Continued)

FOREIGN PATENT DOCUMENTS

JP 2002-332463 A 11/2002
JP 2004-115766 A 4/2004
(Continued)

OTHER PUBLICATIONS

Machine translation of WO-2007079919-A1. (Year: 2007).*
(Continued)

*Primary Examiner* — Patricia L. Nordmeyer
(74) *Attorney, Agent, or Firm* — Maier & Maier, PLLC

(57) ABSTRACT

A release liner which makes it difficult for an adhesive layer to impair slidability and makes it easy to exhibit an adhesive force suitably, a method of producing a release liner, an adhesive sheet, and a method of producing an adhesive sheet. A release liner has a surface provided with a ridge portion extending linearly, and on the surface, a plurality of recesses having different depths are randomly formed in a surface direction and are continuously connected.

6 Claims, 10 Drawing Sheets

(56) References Cited

U.S. PATENT DOCUMENTS

| | | | |
|---|---|---|---|
| 9,353,294 B2* | 5/2016 | Fleming | ............... B29C 59/022 |
| 2003/0124293 A1 | 7/2003 | Sher et al. | |
| 2004/0224129 A1 | 11/2004 | Sakurai et al. | |
| 2021/0189194 A1* | 6/2021 | Schönfelder | ............... C09J 5/00 |

FOREIGN PATENT DOCUMENTS

| | | | | |
|---|---|---|---|---|
| JP | 2005-068350 A | 3/2005 | | |
| JP | 2006-070273 A | 3/2006 | | |
| JP | 2010-058395 A | 3/2010 | | |
| JP | 2010-083915 A | 4/2010 | | |
| JP | 2010-180271 A | 8/2010 | | |
| JP | 2011-000769 A | 1/2011 | | |
| WO | 03/025078 A | 3/2003 | | |
| WO | WO-2007079919 A1 * | 7/2007 | ............ | C09J 7/0232 |
| WO | 2016/059932 A1 | 4/2016 | | |

OTHER PUBLICATIONS

International Search Report with English translation and Written Opinion of the International Searching Authority dated Nov. 12, 2019 in corresponding International application No. PCT/JP2019/034839; 11 pages.

International Search Report with English translation and Written Opinion of the International Searching Authority dated Oct. 30, 2018 in corresponding International application No. PCT/JP2018/033250; 9 pages.

Office Action dated May 31, 2022 in corresponding Chinese Application No. 201980054793.6; 16 pages including English-language translation.

Office Action dated Dec. 23, 2022, in corresponding Chinese Application No. 201980054793.6, 19 pages.

* cited by examiner

RELEASE LINER, METHOD OF PRODUCING RELEASE LINER, ADHESIVE SHEET, AND METHOD OF PRODUCING ADHESIVE SHEET

TECHNICAL FIELD

The present invention relates to a release liner, a method of producing a release liner, an adhesive sheet, and a method of producing an adhesive sheet.

BACKGROUND

When an adhesive sheet is attached to an adherend, such as an automobile, a motorcycle, a train, a truck, an outdoor sign, an outdoor advertisement, a show window, or a wall, for, for example, advertisement and decoration, it is preferable to prevent the adhesive sheet from swelling due to entrance of air between the adherend and the adhesive sheet. For example, in an adhesive sheet disclosed in JP 2010-83915 A, an embossed pattern is provided on a release liner in contact with an adhesive layer, whereby a groove that discharges air is formed in the adhesive layer.

In the above-mentioned prior art, a plurality of microprojections are formed on a surface of the adhesive layer, whereby a contact between the adhesive layer and an adherend is suppressed. Therefore, if the adhesive sheet is in light contact with the adherend, the adhesive sheet can be peeled off once and applied again for alignment, for example.

SUMMARY

However, instead of peeling the adhesive sheet once and applying the adhesive sheet again as described above, if an attempt is made to align the adhesive sheet by sliding the adhesive sheet while the adhesive layer is in light contact with the adherend, in the prior art of Patent Literature 1 described above, since the plurality of microprojections regularly formed on the surface of the adhesive layer are separated from each other and are independent of each other, the microprojections tend to fall down at the time of sliding, and slidable properties (slidability) may be impaired.

After the adhesive sheet is aligned at a predetermined position, the microprojections on the surface of the adhesive layer disappear, and a contact area of the adhesive layer with the adherend increases, so that the adhesive sheet is firmly adhered to the adherend. However, in the prior art of Patent Literature 1 described above, the plurality of microprojections of the adhesive layer are separated from each other and are independent of each other, and a gap between the microprojections is relatively large. Therefore, there is a risk that a spread of the contact area between the adhesive layer and the adherend will stay and an adhesive force will become less likely to be exhibited suitably.

For example, in the example of Patent Literature 1 described above, it is disclosed that the microprojections of the adhesive layer have disappeared one day after the adhesive sheet was attached. However, it is preferable that after alignment, a desired adhesive force be exhibited as immediately as possible so as to prevent the adhesive sheet from moving out of position.

Thus, an object of the present invention is to provide a release liner which makes it difficult for an adhesive layer to impair slidability and makes it easy to exhibit an adhesive force suitably, a method of producing a release liner, an adhesive sheet, and a method of producing an adhesive sheet.

The release liner of the present invention for achieving the above object has a surface provided with a ridge portion extending linearly, and on the surface, a plurality of recesses having different depths are randomly formed in a surface direction and are continuously connected.

The method of producing a release liner of the present invention for achieving the above object includes a pressing step of pressing a surface of a liner material with a roller. In the pressing step, the roller presses the liner material on an outer peripheral surface of the roller in which a groove extending linearly is provided and a plurality of protrusions having different heights are randomly formed in a surface direction and are continuously connected.

The adhesive sheet of the present invention for achieving the above object has the release liner, an adhesive layer disposed on the surface of the release liner, and a base material layer in this order in a stacking direction.

In the method of producing an adhesive sheet of the present invention for achieving the above object, an adhesive layer is disposed on the surface of the release liner, and the release liner, the adhesive layer, and a base material layer are stacked in this order.

According to the invention having the above configuration, the plurality of protrusions having different heights are formed on the surface of the adhesive layer so as to correspond to the plurality of recesses of the release liner. Since the plurality of protrusions are randomly formed in the surface direction and are continuously connected, the protrusions are unlikely to fall down when sliding in a state of being in light contact with an adherend, and therefore slidability is not easily impaired. When the adhesive layer lightly comes into contact with an adherend, among the plurality of protrusions having different heights, some protrusions having a relatively high height come into contact with the adherend. Therefore, as compared with Patent Literature 1 in which the plurality of microprojections have the same height and most of the microprojections are in contact with an adherend, the contact area between the adhesive layer and an adherend is effectively suppressed when the adhesive layer lightly comes into contact with the adherend. Therefore, according to the present invention, the slidability is easily exhibited well.

Since the plurality of protrusions on the surface of the adhesive layer are randomly formed in the surface direction and are continuously connected to each other, the protrusions are easily integrated, and a spread of the contact area between the adhesive layer and an adherend is hard to stay; therefore, an adhesive force is easily exhibited suitably.

DETAILED DESCRIPTION OF THE EMBODIMENTS

Figure 1:
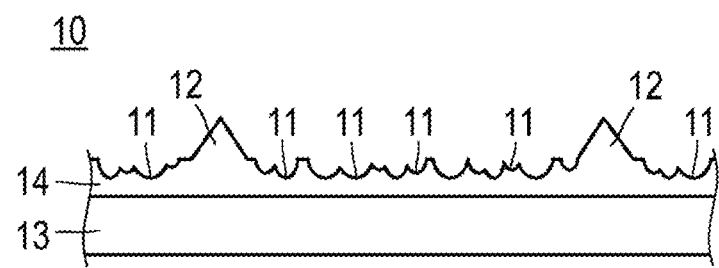
FIG. 1 is a side view showing a configuration of a release liner of an embodiment.

Hereinafter, embodiments of the present invention will be described with reference to the accompanying drawings. Note that the dimensional ratios in the drawings are exaggerated and different from the actual ratios for the convenience of description.

As shown in FIG. 1, a release liner 10 of an embodiment has a surface provided with a ridge portion 12, and a plurality of recesses 11 are formed on the surface.

The release liner 10 has a configuration in which a support 13 and a covering layer 14 are stacked, but the present invention is not limited to this configuration, and a form further having layer other than the support 13 and the covering layer 14 and a form including only a single layer also fall within the scope of the present invention.

The support 13 is, for example, a paper base material formed of woodfree paper, glassine paper, kraft paper, or the like, but the material for forming the support 13 is not particularly limited and may be a resin such as polyethylene terephthalate. A thickness of the support 13 is, for example, 50 μm to 200 μm, but is not limited to this range.

Although the covering layer 14 is provided on a side of one surface of the support 13, a covering layer may be further provided on a side of the other surface opposite to one surface of the support 13. Although the covering layer 14 is formed of a thermoplastic resin such as polyethylene or the like, the material is not limited to the thermoplastic resin, and the covering layer 14 may be formed of another resin. The recess 11 and the ridge portion 12 are formed in the covering layer 14. The plurality of recesses 11 are formed at different depths.

Figure 2:
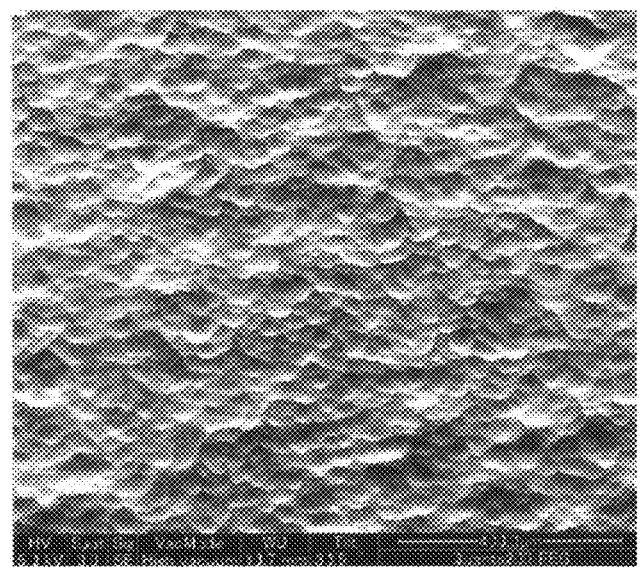
FIG. 2 is an enlarged image of a surface of a release liner in which a plurality of recesses having different depths are randomly formed and are continuously connected.

As shown in FIG. 2, the plurality of recesses 11 having different depths are randomly formed in a surface direction and are continuously connected. A depth of the recess 11 is, for example, 2 μm to 50 μm, but is not limited to this range.

Figure 3:
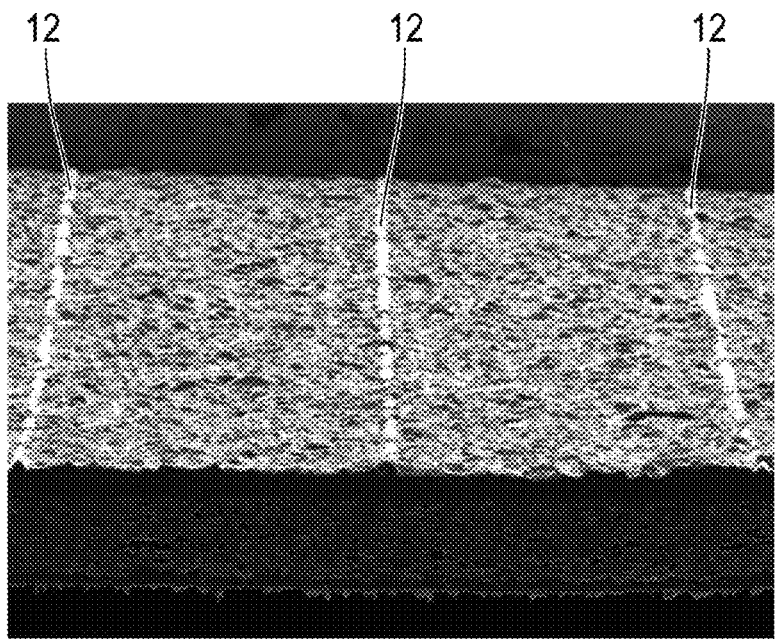
FIG. 3 is an enlarged image of a release liner viewed from an oblique direction with respect to a surface on which a ridge portion and a plurality of recesses are formed.
Figure 4:
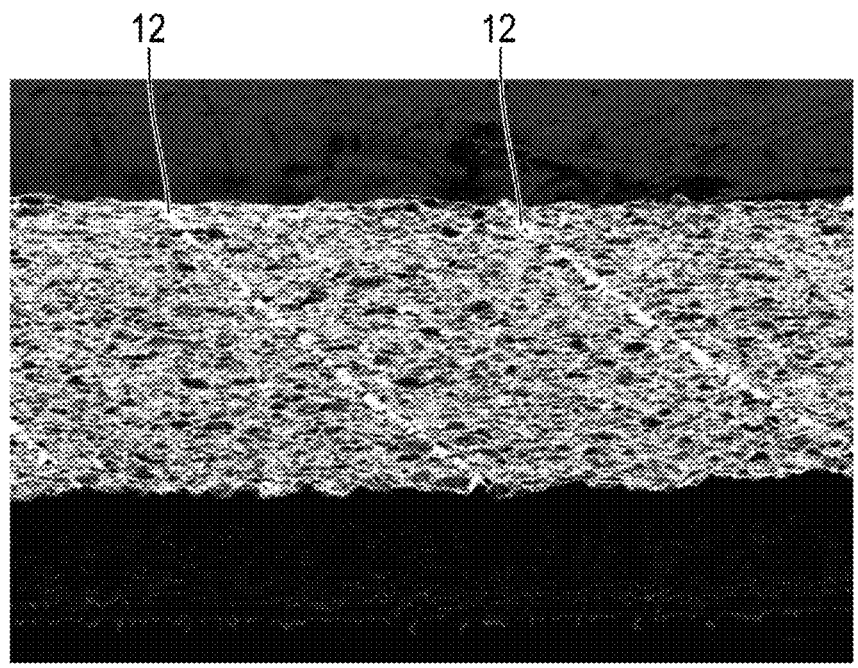
FIG. 4 is an enlarged image of a release liner viewed from an oblique direction with respect to a surface on which a ridge portion and a plurality of recesses are formed.
Figure 5:
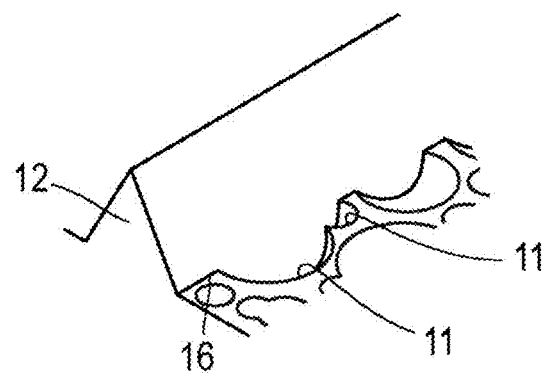
FIG. 5 is an enlarged perspective view showing a ridge portion and an edge portion of a hem of the ridge portion.

As shown in FIGS. 3 and 4, the ridge portion 12 extends linearly on a surface in which the plurality of recesses 11 as shown in FIG. 2 are connected to form fine irregularities. As shown in FIG. 5, the plurality of recesses 11 having different depths are randomly formed and are connected even at an edge 16 of a hem of the ridge portion 12. In the illustrated example, although the ridge portion 12 has a substantially triangular cross-sectional shape, the shape is not limited to this, and the ridge portion 12 may have another cross-sectional shape such as a rectangle, a trapezoid, or the like. A height of the ridge portion 12 is, for example, 5 μm to 50 μm, but the height is not limited to this range.

Figure 6:
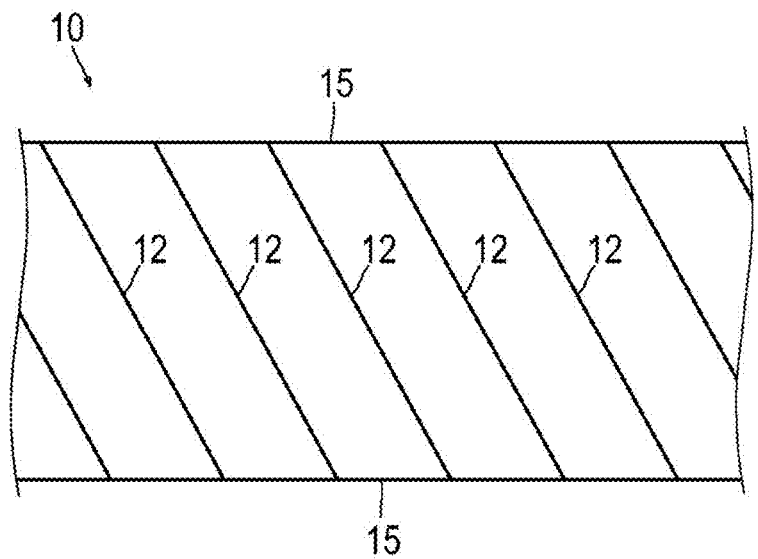
FIG. 6 is a plan view schematically showing a ridge portion, extending linearly on one surface of a release liner of an embodiment, by a straight line.

As shown in FIG. 6, the ridge portion 12 reaches an edge 15 of a surface of the release liner 10. A plurality of the ridge portions 12 are provided so as to be separated from each other at a predetermined pitch. The pitch between the ridge portions 12 is, for example, 200 μm or more and 1000 μm or less.

The ridge portion 12 extends straight in the present embodiment, but the present invention is not limited to this, and a bent form also falls within the scope of the present invention. The number of the ridge portions 12 and the pitch between the ridge portions 12 are not particularly limited. In the present embodiment, the ridge portions 12 are provided in parallel with each other, but the present invention is not limited to this, and a form in which the ridge portions intersect with each other in, for example, a grid pattern also falls within the scope of the present invention.

Next, a method of producing the release liner 10 will be described.

Figure 7:
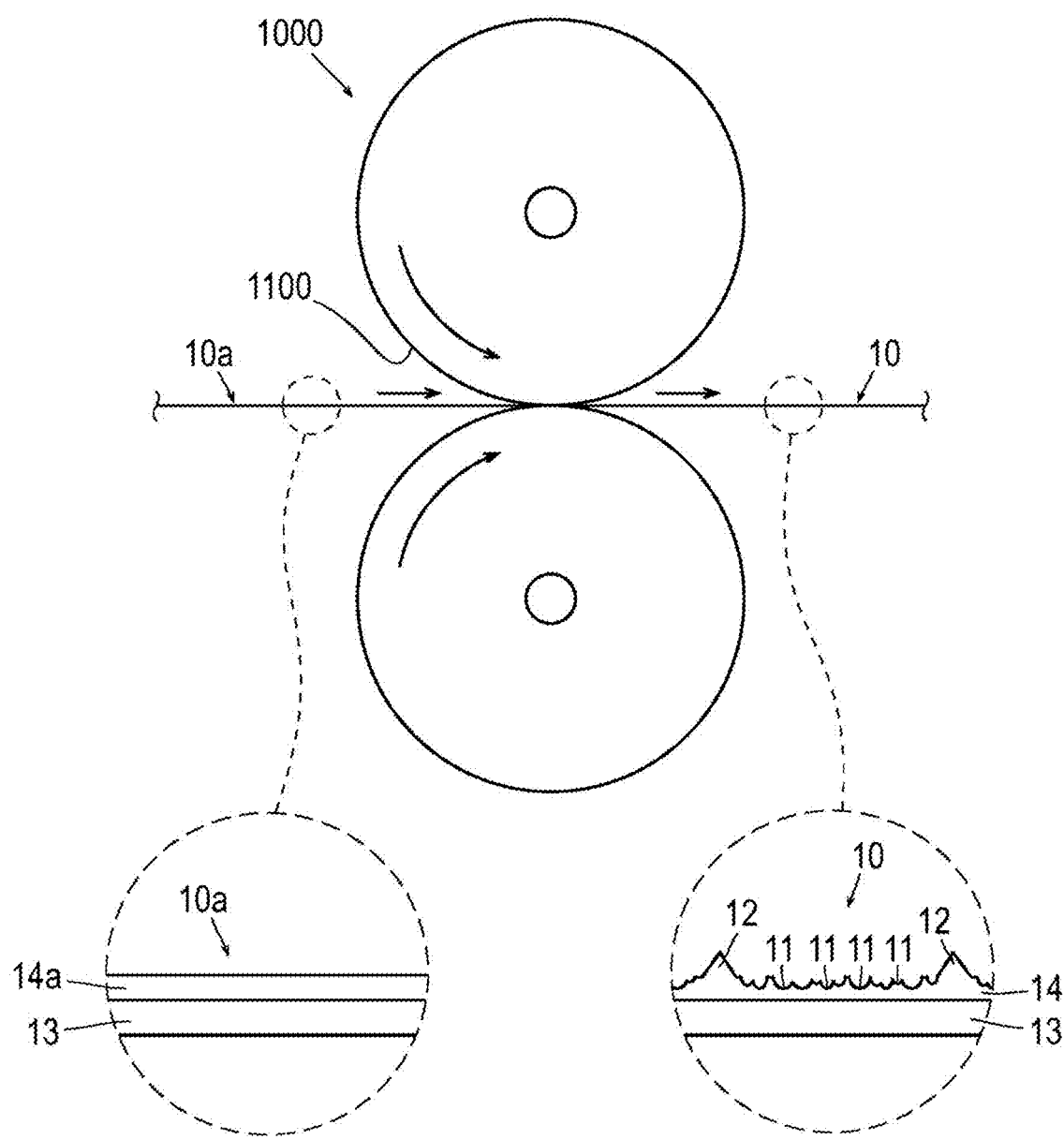
FIG. 7 is a view showing an outline of a method of producing a release liner of an embodiment.

As shown in FIG. 7, the release liner 10 is produced by preparing a liner material 10a as a base of the release liner 10 and pressing a surface of the liner material 10a with a roller 1000.

Although the liner material 10a is different from the release liner 10 in that the liner material 10a has a smooth covering layer 14a, the support 13 is common, and the liner material 10a has a configuration in which the support 13 and the covering layer 14a are stacked. Although the covering layer 14a differs from the covering layer 14 in that the covering layer 14a is smooth, the material itself of the covering layer 14a is the same as that of the covering layer 14. The liner material 10a is produced by, for example, extruding and coating the covering layer 14a on the support 13.

After the liner material 10a is prepared, a pressing step is performed in which the roller 1000 presses the surface of the liner material 10a. In the pressing step, a substantially flat surface of the covering layer 14a is strongly pressed from an outer peripheral surface 1100 of the roller 1000 and is deformed, whereby the recess 11 and the ridge portion 12 are formed to produce the release liner 10. At this time, it is preferable that the covering layer 14a or the roller 1000 be heated.

Figure 8:
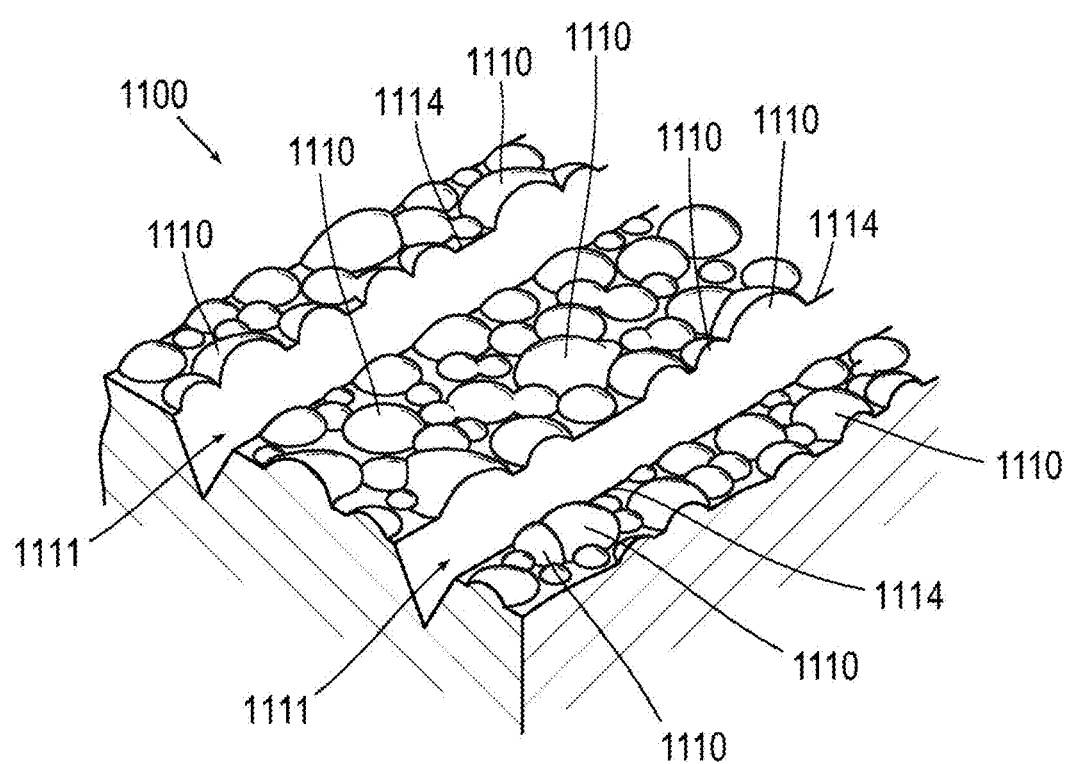
FIG. 8 is a partially enlarged view showing an example of an outer peripheral surface of a roller used for producing a release liner.

As shown in FIG. 8, on the outer peripheral surface 1100 of the roller 1000, a plurality of protrusions 1110 having different heights are formed, and a groove 1111 is formed. The plurality of protrusions 1110 having different heights are randomly formed in the surface direction and are continuously connected. The plurality of protrusions 1110 having different heights are randomly formed and are connected at an edge 1114 of an opening of the groove 1111. Although the groove 1111 has a substantially triangular cross-sectional shape, the shape is not limited to this, and the groove 1111 may have another cross-sectional shape such as a rectangle or a trapezoid.

As a result of the outer peripheral surface 1100 being strongly pressed against the covering layer 14a of the liner material 10a in the pressing step, a surface of the covering layer 14a is deformed into an inverted shape of the protrusion 1110 and the groove 1111. The inverted shape of the protrusion 1110 shapes the recess 11 in the release liner 10, and the inverted shape of the groove 1111 shapes the ridge portion 12 in the release liner 10. The protrusion 1110 and the groove 1111 are formed by processing the outer peripheral surface 1100. A processing example thereof is shown in FIG. 9.

Figure 9:
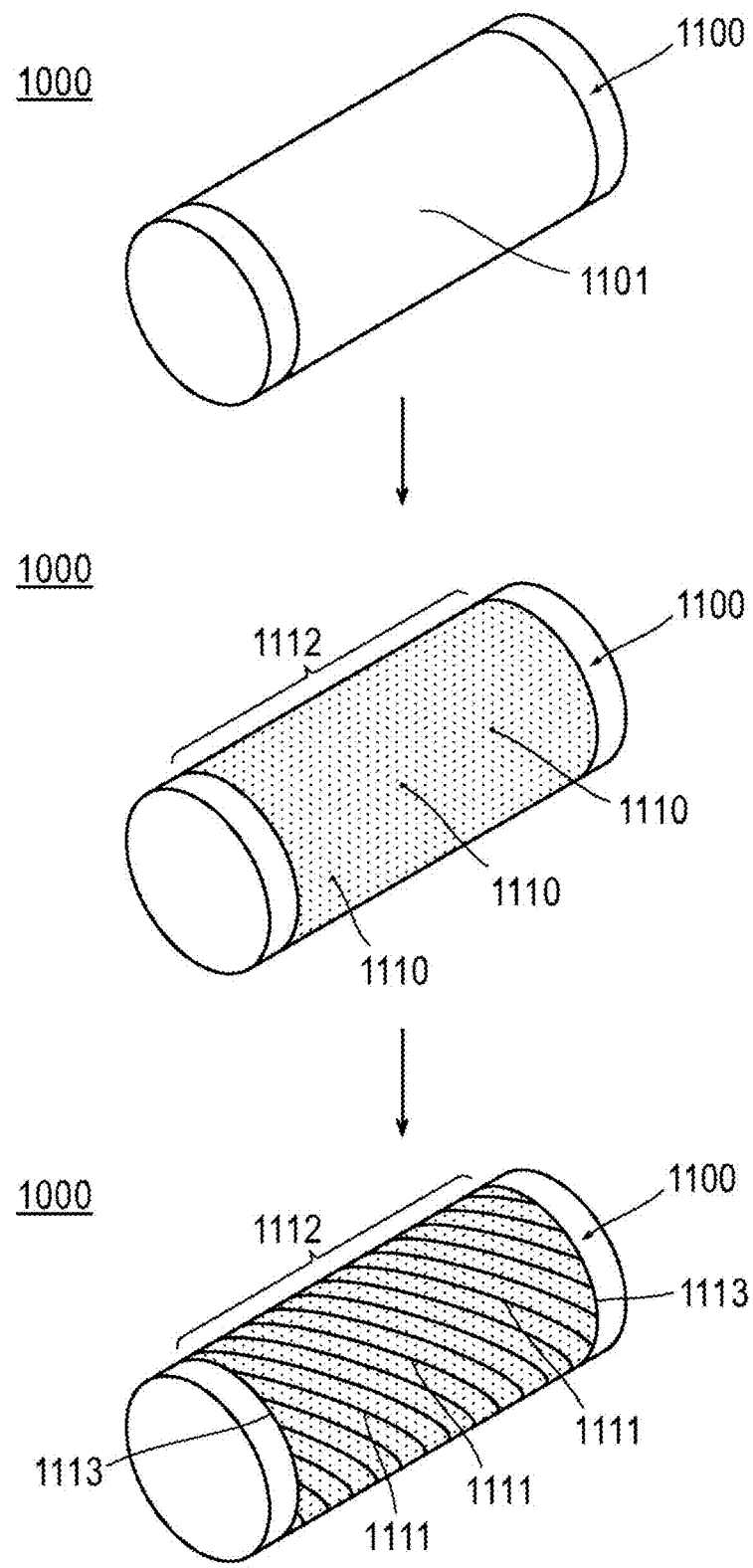
FIG. 9 is a view showing an example of a processing process of a roller used for producing a release liner.

In the processing example shown in FIG. 9, first, metal plating 1101 such as copper plating or the like is applied to the outer peripheral surface 1100 of the roller 1000 in a state where the protrusion 1110 and the groove 1111 are not formed.

After that, the plurality of protrusions 1110 are formed by performing sandblasting treatment on a portion where the metal plating 1101 is applied. The plurality of protrusions 1110 are formed innumerably by a collision of particles projected by the sandblasting treatment.

After the protrusion 1110 is formed, the groove 1111 is formed in a formation range 1112 of the protrusion 1110. Means of forming the groove 1111 is not particularly limited, and the groove 1111 may be formed by, for example, a diamond bite, a laser, a combination of a laser and etching, an end mill, or the like, or may be formed by electrocasting. Although a plurality of the grooves 1111 are formed so as to be separated at a predetermined pitch, the number and pitch of the grooves 1111 are not particularly limited. In the present embodiment, the grooves 1111 are provided in parallel with each other, but the present invention is not limited to this, and a form in which the grooves intersect with each other in, for example, a grid pattern also falls within the scope of the present invention. The groove 1111 extends linearly and reaches an edge 1113 of the formation range 1112 of the protrusion 1110.

Although the plurality of protrusions 1110 and grooves 1111 are formed on the outer peripheral surface 1100 at a central portion of the roller 1000, the protrusions 1110 and grooves 1111 may be formed on the outer peripheral surface 1100 as a whole of the roller 1000.

In the illustrated processing example, although the groove 1111 is formed after the plurality of protrusions 1110 are formed first, the order in which the protrusions 1110 and groove 1111 are formed on the outer peripheral surface 1100 is not particularly limited. For example, unlike the above-mentioned processing example, a form in which the plurality of protrusions 1110 are formed by sandblasting treatment after the groove 1111 is first formed by cutting or the like also falls within the scope of the present invention.

Next, an adhesive sheet 100 of an embodiment will be described.

Figure 10:
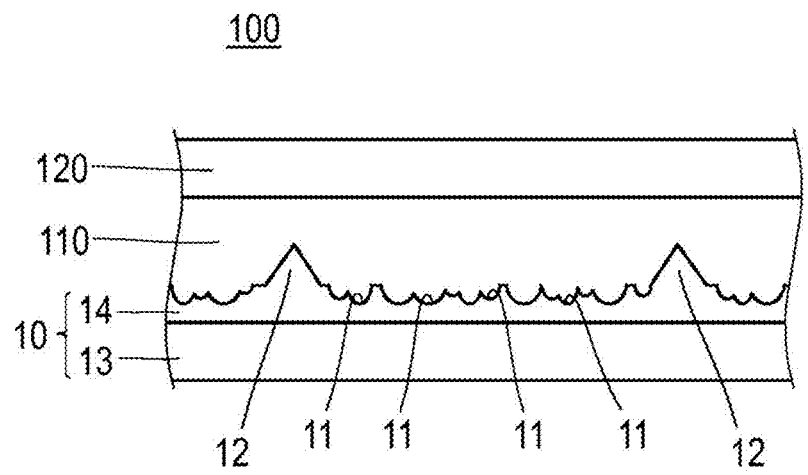
FIG. 10 is a side view showing a configuration of an adhesive sheet of an embodiment.

As shown in FIG. 10, an adhesive sheet 100 of an embodiment has the release liner 10 described above, an adhesive layer 110, and a base material layer 120 in this order in the stacking direction.

The adhesive layer 110 is disposed on a surface where the recess 11 and the ridge portion 12 are formed with respect to the release liner 10. The adhesive layer 110 and the release liner 10 can be peeled off. In order to improve peelability between the adhesive layer 110 and the release liner 10, a release agent such as silicone may be applied to a surface of the release liner 10 where the recess 11 and the ridge portion 12 are provided.

Examples of the material for forming the adhesive layer 110 include acrylic adhesives, rubber-based adhesives, silicone-based adhesives, urethane-based adhesives, styrene-based block copolymer adhesives, and the like, but are not particularly limited. The material may be used alone or in combination of two or more. A thickness of the adhesive layer 110 is, for example, 10 μm to 100 μm, but is not limited to this range.

The base material layer 120 can be variously designed according to the use of the adhesive sheet 100. For example, when the adhesive sheet 100 is an adhesive sheet that is attached to an adherend of an automobile or the like to decorate the adherend, the base material layer 120 has, for example, a laminated structure in which a support layer formed of resin, a decorative layer including decorations such as colors and patterns, and a transparent protective layer are stacked in this order; however, the present invention is not limited to this, and for example, a form including only a single resin layer also fall within the scope of the present invention. The thickness of the base material layer 120 is, for example, 30 μm to 250 μm, but is not limited to this range. The material for forming the base material layer 120 is not particularly limited, but is, for example, polyvinyl chloride, polyurethane, or the like. Here, polyvinyl chloride is preferable from the viewpoint of forming a print layer by inkjet printing or the like.

The adhesive sheet 100 is used by peeling off the release liner 10, and is attached to an adherend via the exposed adhesive layer 110.

Figure 11:
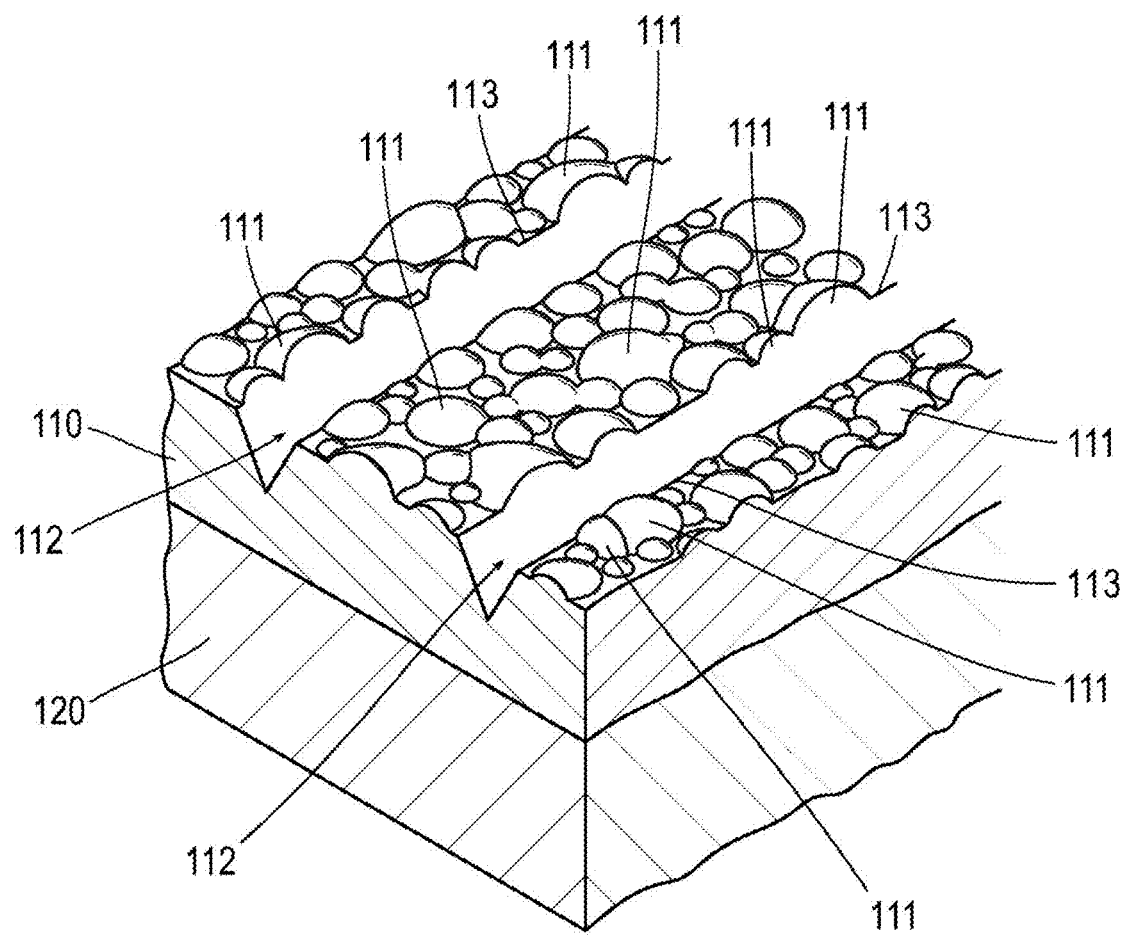
FIG. 11 is a partially enlarged view of a surface of an adhesive layer in an adhesive sheet of an embodiment.

As shown in FIG. 11, a plurality of protrusions 111 having different heights and groove 112 are formed on a surface of the adhesive layer 110. The plurality of protrusions 111 may have different widths as well as heights. The plurality of protrusions 111 have a shape in which the plurality of recesses 11 of the release liner 10 are inverted, and the groove 112 has a shape in which the ridge portion 12 of the release liner 10 is inverted.

Figure 12:
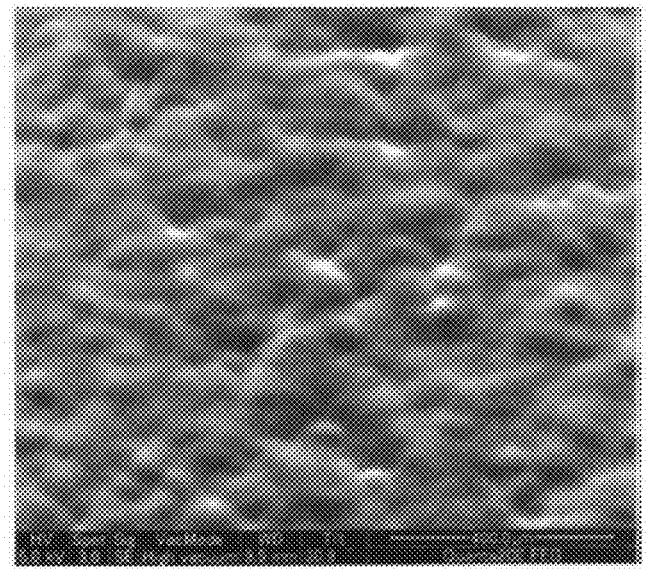
FIG. 12 is an enlarged image of a surface of an adhesive layer in which a plurality of protrusions having different heights are randomly formed and are continuously connected.

As shown in FIG. 12, the plurality of protrusions 111 having different heights are randomly formed in the surface direction and are continuously connected. The groove 112 is formed at a position where such a plurality of protrusions 111 are connected to form fine irregularities. As shown in FIG. 11, the plurality of protrusions 111 having different heights are randomly formed and are connected at an edge 113 of an opening of the groove 112. A width of the groove 112 is, for example, 10 μm or more and 200 μm or less.

The protrusion 111 and the groove 112 are formed by disposing the adhesive layer 110 on the surface where the recess 11 and the ridge portion 12 are provided with respect to the release liner 10. Through the surface of the release liner 10, the shapes of the protrusion 1110 and the groove 1111 of the roller 1000 are transferred to the surface of the adhesive layer 110, resulting in the formation of the protrusion 111 and the groove 112. Therefore, the shapes of the protrusion 1110 and the groove 1111 of the roller 1000 and the shapes of the protrusion 111 and the groove 112 of the adhesive layer 110 are substantially the same.

Figure 13:
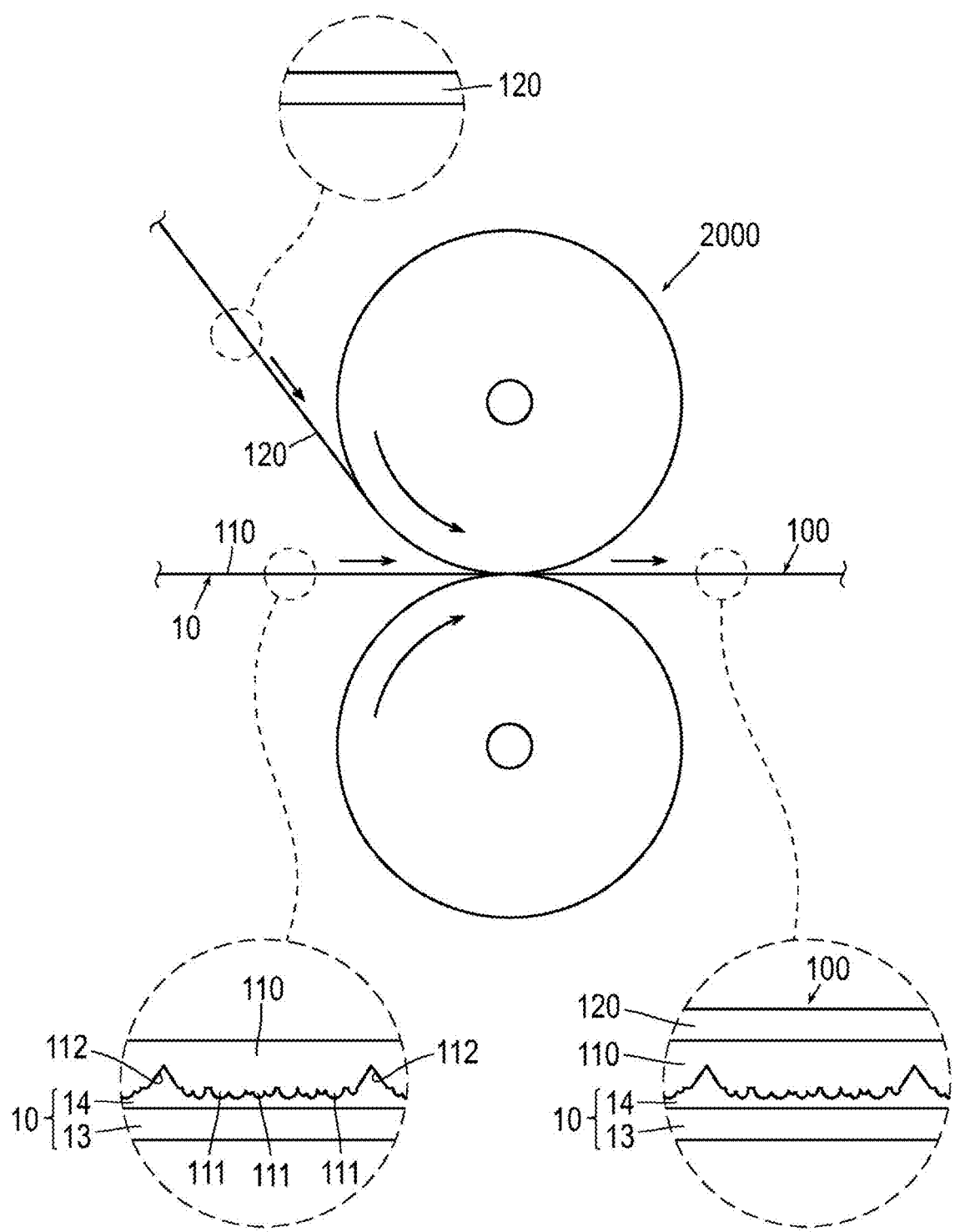
FIG. 13 is a view showing an outline of a method of producing an adhesive sheet of an embodiment.

As shown in FIG. 13, the adhesive sheet 100 is produced by stacking the release liner 10, the adhesive layer 110, and the base material layer 120 in this order. In the illustrated example, the adhesive layer 110 is stacked on the release liner 10, and then the base material layer 120 is stacked on the adhesive layer 110.

The adhesive layer 110 is formed by applying an adhesive composition on the release liner 10, and the protrusion 111 and the groove 112 are also formed accordingly. The base material layer 120 is stacked on the adhesive layer 110 by using a roller 2000, and the adhesive layer 110 and the base material layer 120 are pressed and bonded together by the roller 2000.

Unlike the illustrated example, a form in which the adhesive layer 110 is stacked on the base material layer 120 and then the release liner 10 is stacked on the adhesive layer 110 also falls within the scope of the present invention.

Next, the action and effect of the present embodiment will be described.

According to the present embodiment, the protrusion 111 and the groove 112 are formed in the adhesive layer 110 so as to correspond to the recess 11 and the ridge portion 12 of the release liner 10. Even if the adhesive sheet 100 is attached to an adherend via the adhesive layer 110 and a gas is interposed between them, the gas is discharged to the outside of the adhesive layer 110 according to the present embodiment, and therefore swelling of the adhesive sheet 100 at the time of attachment is suppressed.

Although such gas discharge occurs through between the protrusions 111 and through the groove 112 in the adhesive layer 110, as compared with the plurality of protrusions 111 randomly formed, the groove 112 can particularly easily discharge gas and suppress the swelling of the adhesive sheet 100 more effectively since the groove 112 is formed by the ridge portion 12 reaching the edge 15 of the release liner 10 and reliably reaches an edge of the adhesive layer 110.

Since the plurality of protrusions 111 having different heights are randomly formed on the surface of the adhesive layer 110 so as to correspond to the plurality of recesses 11 of the release liner 10 and the protrusions 111 come in point contact with an adherend at their tips in a state where the adhesive layer 110 is in light contact with the adherend, the contact area between the adhesive layer 110 and the adherend is effectively reduced. Therefore, the adhesive sheet 100 easily exhibits a slidable property (slidability) in a state where the adhesive layer 110 is in light contact with an adherend.

Figure 14:
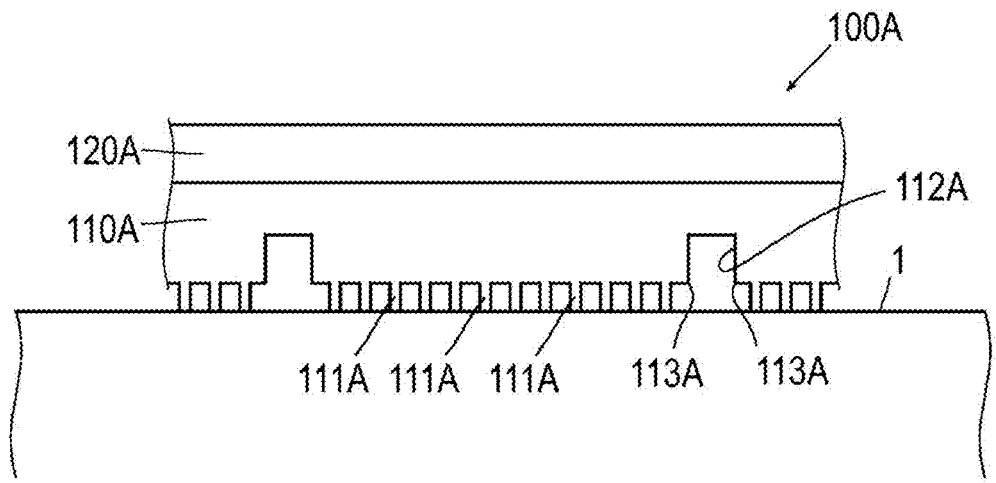
FIG. 14 is a view showing an adhesive sheet of a comparative example in contact with an adherend.

As shown in FIG. 14, when an adhesive sheet 100A of a comparative example different from the present embodiment has the configuration disclosed in Patent Literature 1 described above, a plurality of microprojections 111A on a surface of an adhesive layer 110A are separated from each other and are independent of each other. Each of the plurality of microprojections 111A comes in point contact with an adherend 1 at the tip in a state of being in light contact with the adherend 1, whereby the contact between the adherend 1 and the adhesive layer 110A is suppressed. Therefore, the adhesive sheet 100A in light contact with an adherend 1 can be peeled off once and applied again for alignment, for example.

Figure 15:
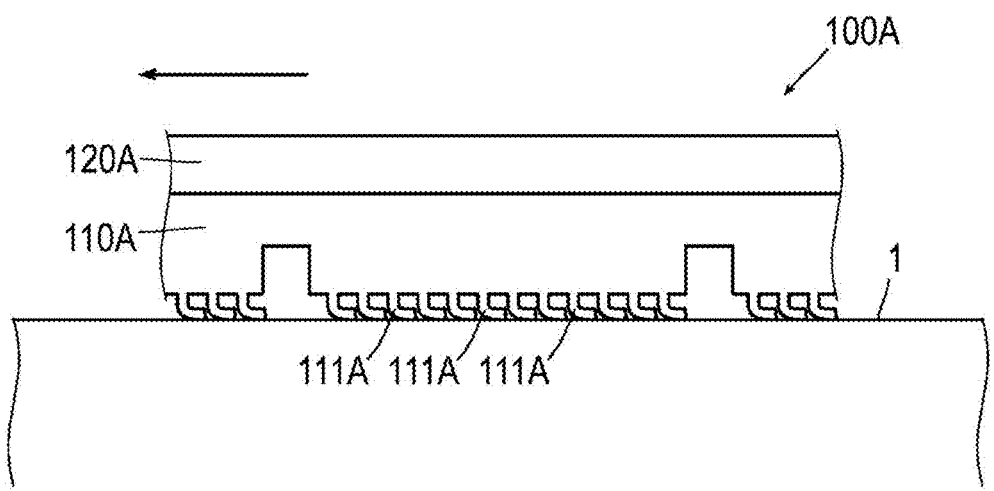
FIG. 15 is a view showing an adhesive sheet of a comparative example that slides while in contact with an adherend.

However, as shown in FIG. 15, if the adhesive sheet 100A is not peeled off once but is kept in contact with an adherend 1 and is to be slid for alignment, for example, the independent microprojection 111A as in Patent Literature 1 described above tends to fall down and increases a contact region with the adherend 1, and therefore, resistance at the time of sliding increases. Therefore, the slidability may be impaired.

Figure 16:
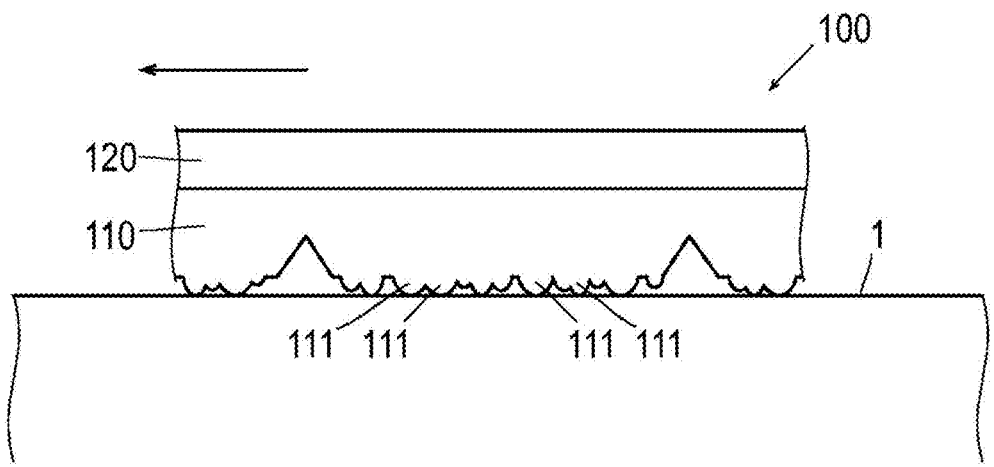
FIG. 16 is a view showing an adhesive sheet of an embodiment that slides while in contact with an adherend.

On the other hand, as shown in FIG. 16, in the present embodiment, the plurality of protrusions 111 on the surface of the adhesive layer 110 are randomly formed in the surface direction and are continuously connected so as to correspond to the recesses 11 of the release liner 10, and therefore, the protrusions 111 are unlikely to fall down when sliding in a state of being in light contact with an adherend 1. Therefore, according to the present embodiment, the slidability is not easily impaired.

When the adhesive layer 110 lightly comes into contact with an adherend 1, among the plurality of protrusions 111 having different heights, some protrusions 111 having a relatively high height come into contact with the adherend 1. Therefore, as shown in FIG. 14, as compared with the comparative example in which all of the plurality of microprojections 111A have the same height and are in contact with an adherend 1, the contact area between the adhesive layer 110 and an adherend 1 is effectively suppressed in a state where the adhesive layer 110 lightly comes into contact with the adherend 1. Therefore, according to the present embodiment, the slidability is easily exhibited well.

As in the comparative example, when the plurality of microprojections 111A are separated from each other and are independent of each other and a gap between the microprojections 111A is relatively large, there is a risk that a spread of the contact area between the adhesive layer 110A and an adherend 1 will stay and an adhesive force will become less likely to be exhibited suitably.

On the other hand, in the present embodiment, since the plurality of protrusions 111 on the surface of the adhesive layer 110 are randomly formed in the surface direction and are continuously connected to each other, the protrusions 111 are easily integrated, and a spread of the contact area between the adhesive layer 110 and an adherend 1 is hard to stay; therefore, the adhesive force is easily exhibited suitably.

In the comparative example, if a groove 112A formed in the adhesive layer 110A has, for example, an edge 113A extending linearly in a surface direction of the adhesive layer 110A, after the adhesive sheet 100A is attached to an adherend 1, the edge 113A of the groove 112A may be visually recognized as a streak so as to rise on the base material layer 120A side. Such a streak is not preferable because, for example, when the base material layer 120A has a high gloss or has a print layer on which an image is printed by inkjet printing or the like, the streak tends to be noticeable and the appearance may be impaired.

On the other hand, in the present embodiment, as shown in FIG. 5, the plurality of recesses 11 having different depths are randomly continuously formed even at the edge 16 of the hem of the ridge portion 12 of the release liner 10. Correspondingly, in the adhesive layer 110 of the adhesive sheet 100, as shown in FIG. 11, the plurality of protrusions 111 having different heights are randomly continuously formed at the edge 113 of the opening of the groove 112. Therefore, the edge 113 is mixed with irregularly continuous fine irregularities and prevented from being visually recognized as a streak so as to rise on the base material layer 120 side. Therefore, according to the present embodiment, the appearance of the adhesive sheet 100 is not easily impaired.

The present invention is not limited to the aforementioned embodiment, and may be modified in various forms within the scope of the claims. For example, the shapes of the release liner and the adhesive sheet are not limited to the elongated shape as in the above embodiment, and may be other shapes such as a rectangular shape and the like.

In the above description, as an example of the adhesive sheet, the adhesive sheet for advertisement or decoration is mentioned, but the present invention is not limited to this. The adhesive sheet of the present invention includes, for example, an adhesive label, a double-sided adhesive tape, and the like.

This application is based on International Application No. PCT/JP2018/033250 filed on Sep. 7, 2018, and its disclosure is incorporated herein by reference in its entirety.

The invention claimed is:

1. A release liner comprising: a surface provided with a plurality of ridge portions extending linearly,
   wherein the ridge portions are seamlessly and integrally formed with the surface, and, on the surface, a plurality of recesses having different depths are randomly formed between two ridge portions in a surface direction and are continuously connected.

2. The release liner according to claim 1, wherein the plurality of recesses having different depths are randomly formed and are connected even at an edge of a hem of the ridge portions.

3. The release liner according to claim 1, wherein the plurality of recesses having different depths formed between two ridge portions are continuously connected to each other in the surface direction.

4. The release liner according to claim 1, wherein the ridge portions extend from a first edge of the release liner to a second edge of the release liner.

5. An adhesive sheet comprising the release liner according to claim 1, an adhesive layer disposed on the surface of the release liner, and a base material layer in this order in a stacking direction.

6. A method of producing an adhesive sheet comprising disposing an adhesive layer on the surface of the release liner according to claim 1 and stacking the release liner, the adhesive layer, and a base material layer in this order.

* * * * *